United States Patent
Sutphen

(10) Patent No.: US 8,342,461 B2
(45) Date of Patent: Jan. 1, 2013

(54) COLLAPSIBLE WASTE AND RECYCLING BAG HOLDER

(75) Inventor: David C. Sutphen, Whitehall, MD (US)

(73) Assignee: Butler Concepts, LLC, White Hall, MD (US)

( * ) Notice: Subject to any disclaimer, the term of this patent is extended or adjusted under 35 U.S.C. 154(b) by 0 days.

(21) Appl. No.: 13/039,532

(22) Filed: Mar. 3, 2011

(65) Prior Publication Data

US 2011/0215205 A1    Sep. 8, 2011

Related U.S. Application Data

(60) Provisional application No. 61/339,463, filed on Mar. 3, 2010.

(51) Int. Cl.
| | |
|---|---|
| A63B 55/04 | (2006.01) |
| B65B 67/04 | (2006.01) |
| B65B 67/12 | (2006.01) |
| B65D 41/56 | (2006.01) |
| B65D 51/00 | (2006.01) |
| B65D 43/03 | (2006.01) |
| B65D 55/00 | (2006.01) |
| B65D 43/08 | (2006.01) |

(52) U.S. Cl. .............. 248/97; 248/95; 248/99; 248/907; 220/908; 220/521; 220/379; 220/212; 220/796

(58) Field of Classification Search .............. 248/97, 248/95, 99, 907; 220/908, 521, 379, 212, 220/796
See application file for complete search history.

(56) References Cited

U.S. PATENT DOCUMENTS

| 2,804,230 | A | * | 8/1957 | Attias et al. .................. 220/812 |
| 3,260,488 | A | * | 7/1966 | Kliewer et al. .................. 248/99 |
| 3,589,595 | A | | 6/1971 | White |
| 3,653,619 | A | * | 4/1972 | Plum .............................. 248/99 |
| 4,222,598 | A | | 9/1980 | Ullger |
| 4,279,357 | A | * | 7/1981 | Robinson ...................... 220/318 |
| 4,402,452 | A | | 9/1983 | Kupersmit |
| 4,643,380 | A | | 2/1987 | Copeland |
| 4,657,176 | A | | 4/1987 | Matsubara |
| 4,764,029 | A | | 8/1988 | Abblett |
| 4,765,579 | A | * | 8/1988 | Robbins et al. ............... 248/101 |
| 4,815,866 | A | * | 3/1989 | Martone ...................... 383/34.1 |
| 5,056,679 | A | | 10/1991 | Lonczak |
| 5,105,972 | A | | 4/1992 | Waterston et al. |
| 5,381,916 | A | * | 1/1995 | Strawder ...................... 220/23.4 |
| 5,393,023 | A | | 2/1995 | Callan |

(Continued)

*Primary Examiner* — Terrell McKinnon
*Assistant Examiner* — Christopher Garft
(74) *Attorney, Agent, or Firm* — Whiteford, Taylor & Preston LLP

(57) ABSTRACT

A portable trash container for holding a removable plastic bag for storing paper, bottles, cans, and like trash. The holder includes rectangular front and rear panels, each having a top, bottom and side edges, (b) two side panels, each having two rectangular, foldable parts with top, bottom and side edges, (c) side hinges which connect the adjoining side edges of said side panel folding parts so as to allow them to fold together along said hinges, (d) primary hinges which connect the side edges of said front and rear panels to the outer side edges of said side panel folding parts so as to allow the side panels to be folded so that the front and rear panels can be brought into close and overlapping proximity to one another, and (e) a top ring that is adapted to fit over the top edges of said panels so as to locate and hold open the opening of a throw-away, trash collection bag.

12 Claims, 18 Drawing Sheets

U.S. PATENT DOCUMENTS

| | | | | |
|---|---|---|---|---|
| 5,518,135 A * | 5/1996 | Freund | | 220/796 |
| 5,624,050 A * | 4/1997 | Haas | | 220/4.05 |
| 5,730,451 A * | 3/1998 | Walker | | 280/47.26 |
| 5,785,046 A * | 7/1998 | Colla | | 126/9 R |
| 5,862,932 A | 1/1999 | Walsh et al. | | |
| 5,897,084 A * | 4/1999 | Judge | | 248/95 |
| 5,984,134 A * | 11/1999 | Mario | | 220/661 |
| 6,007,030 A * | 12/1999 | Judge | | 248/95 |
| 6,073,943 A * | 6/2000 | Serrault | | 280/47.26 |
| 6,325,341 B1 | 12/2001 | Brown | | |
| 6,651,942 B1 | 11/2003 | Yardley et al. | | |
| 6,659,407 B2 | 12/2003 | Asaro | | |
| 6,994,301 B1 | 2/2006 | Fox | | |
| 7,066,476 B2 * | 6/2006 | Elden | | 280/37 |
| 7,195,127 B2 | 3/2007 | Hsu et al. | | |
| 7,255,239 B2 | 8/2007 | Liu et al. | | |
| 2003/0116564 A1 | 6/2003 | Overholt et al. | | |
| 2004/0195467 A1 * | 10/2004 | Passage | | 248/99 |

* cited by examiner

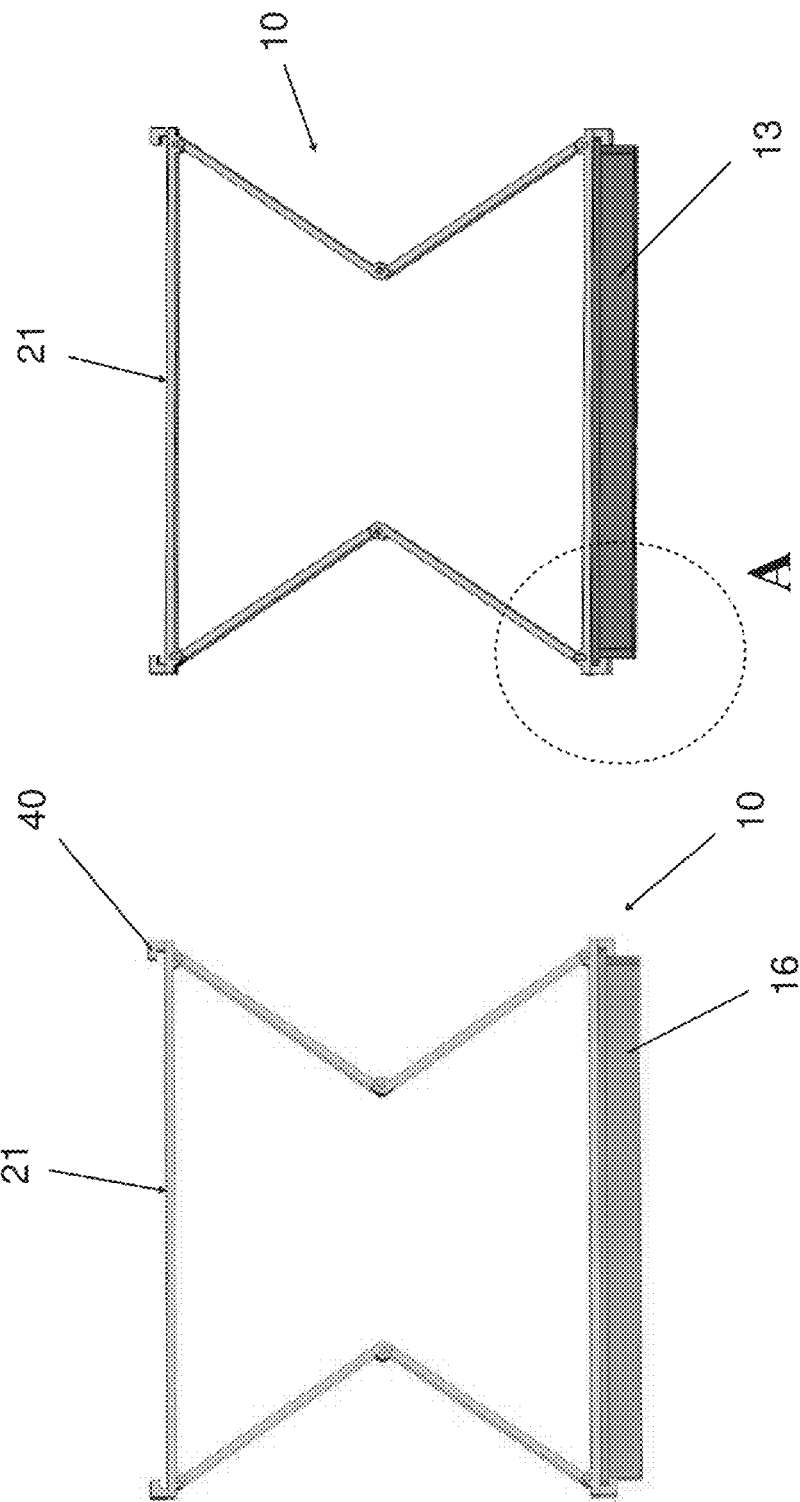

COLLAPSIBLE WASTE AND RECYCLING BAG HOLDER

CROSS REFERENCE TO RELATED APPLICATION

This application is based upon and claims benefit of copending and co-owned U.S. Provisional Patent Application Ser. No. 61/339,463 entitled "Collapsible Waste and Recycling Container", filed with the U.S. Patent and Trademark Office on Mar. 3, 2010 by the inventor herein, the specification of which is incorporated herein by reference.

BACKGROUND

1. Field of the Invention

This invention relates to supports or bag holders. More particularly, this invention relates to a collapsible garbage bag holder or, in some instances, a collapsible waste and recycling receptacle, container, or can.

2. Description of Related Art

Disposable plastic bags are used ubiquitously in various applications. Their durable, lightweight, and disposable features have contributed to their popularity. However, when used for tasks such as collection of trash or other material, a disposable plastic bag alone is impractical. Typically, the mouth of the plastic bag tends to close.

This problem is pronounced when one person must hold the mouth of the bag open while attempting to insert trash or the like. Windy conditions exacerbate the problem by blowing the mouth closed, especially when the bag is empty or nearly empty. If the mouth is held open, one may efficiently insert trash and other material. Generally, such tasks require two people, or a very dexterous person. However, even a single talented person may be unable to fully hold the bag open and also insert trash.

One solution is to use a sturdy support container for the bag, such as a trash can lined with the plastic bag. However, trashcans, particularly those designed to hold large yard bags, are large, heavy, and cumbersome. Furthermore, once filled, typically the plastic bag must be lifted from the trashcan for disposal.

Support devices for holding collapsible bags in open position are not new to this art. Some of the prior art devices incorporate a circular loop having a series of hooks mounted thereon for hooking a bag in various positions about the periphery of the mouth. These hooks have tended to initiate rips and tears at stress points in the collapsible bag, thereby essentially destructing the bag when it is attempted to use the bag as intended, not to mention the time consuming task of attaching this series of hooks to the bag itself. Other devices incorporating a ring to hold the bag utilize clamps positioned about the periphery of the ring and bag to hold the bag in position. Although the clamps themselves did not rip or tear the collapsible bag, the problem of non-uniform support around the bag mouth periphery remained, resulting in potential tears at the stress points of connection of the bag to the ring.

Other solutions offer a framework to support the plastic bag. However, these devices are often complicated, thin, and cumbersome. Often such devices must be stored in an assembled condition, thereby wasting valuable storage space.

Other bag holding devices incorporated a support pole with a ring mounted thereto that was formed from two essentially flat pieces of flexible material attached to each other to form the circular ring. Due to the required flexibility and inherent low torsional resistance, this type of bag support device lacked sufficient support to maintain a collapsible bag attached thereto upright under moderate loading conditions.

Additionally, conventional bag supports such as garbage cans are generally bulky items that require considerable space for storage as well as for display in retail stores, and are awkward to handle due to their bulkiness. It would thus be desirable if such items could be collapsed so as to require less space and be more convenient to handle.

Public events that draw large crowds to sites that do not often accommodate such events usually encounter the need to place a large number of trashcans or receptacles temporarily at various locations throughout the sites. This can often prove to be an expensive and time-consuming task depending on how many receptacles must be used to collect the quantities of garbage that can be estimated to be produced because of the public event. For example, many truckloads of comparatively large, heavy receptacles may have to be rented and transported to and from the site, then situated at various locations on the site from which the garbage must be collected.

Improved, lower cost, and less-manpower intensive techniques and methods are needed to provide for the garbage and trash handling needs of such public events.

SUMMARY

Recognizing the need for improvements in the equipment, techniques, and methods for meeting the garbage and trash collection requirement that are created by holding large public events at sites that aren't often used for such events, the present invention is generally directed to satisfying this need and overcoming the limitations seen in the prior art devices and methods.

It is, therefore, an object of the present invention to provide a collapsible bag holder that avoids the disadvantages of the prior art.

It is another object of the present invention to provide improved equipment, techniques, and methods for meeting the garbage and trash collection requirements that are created by holding large public events at sites that are not often used for such events.

It is another object of the present invention to provide lower cost and less worker intensive techniques and methods for meeting garbage and trash collection needs.

In accordance with the present invention, a collapsible garbage or trash bag holder for primary use with a throw-away, trash collection bag, of the type that has a large opening through which trash can be inserted into the bag, and where the holder can fold into a flat shape for storage and is especially well suited for use in locations that temporarily require garbage or trash collection, includes: (a) rectangular front and rear panels, each having a top, bottom and side edges, (b) two side panels, each having two rectangular, foldable parts with top, bottom and side edges, (c) side hinges which connect the adjoining side edges of said side panel folding parts so as to allow them to fold together along said hinges, (d) primary hinges which connect the side edges of said front and rear panels to the outer side edges of said side panel folding parts so as to allow the side panels to be folded so that the front and rear panels can be brought into close and overlapping proximity to one another, and (e) a top ring that is adapted to fit over the top edges of said panels so as to locate and hold open the opening of a throw-away, trash collection bag.

When the holder is deployed, the sides are folded out into a rectangular shaped cylinder having an open top and bottom. The shape is then maintained by placing a top ring over the holder. This ring prevents the holder from collapsing and holds a throwaway, trash collection bag in place. Once the ring is removed, the holder can collapse into a flat position equaling the approximate thickness of its four sides.

To empty the holder, its top ring is removed, then the throwaway, trash collection bag is tied at its top and the holder is lifted up off the collection bag. The bag of trash can then be thrown into a proper disposal unit. The holder can also be used without a collection bag or liner to create organized piles of waste when the holder is removed. In such instances, the present invention might more appropriately be referred to merely as a receptacle, rather than as a holder.

BRIEF DESCRIPTION OF THE DRAWINGS

The above and other features, aspects, and advantages of the present invention are considered in more detail, in relation to the following description of embodiments thereof shown in the accompanying drawings, in which:

FIG. 6 is a bottom plan view of the holder of FIG. 2.

FIG. 7 is a top plan view of the holder of FIG. 2.

DETAILED DESCRIPTION OF PREFERRED EMBODIMENTS

Figure 1:
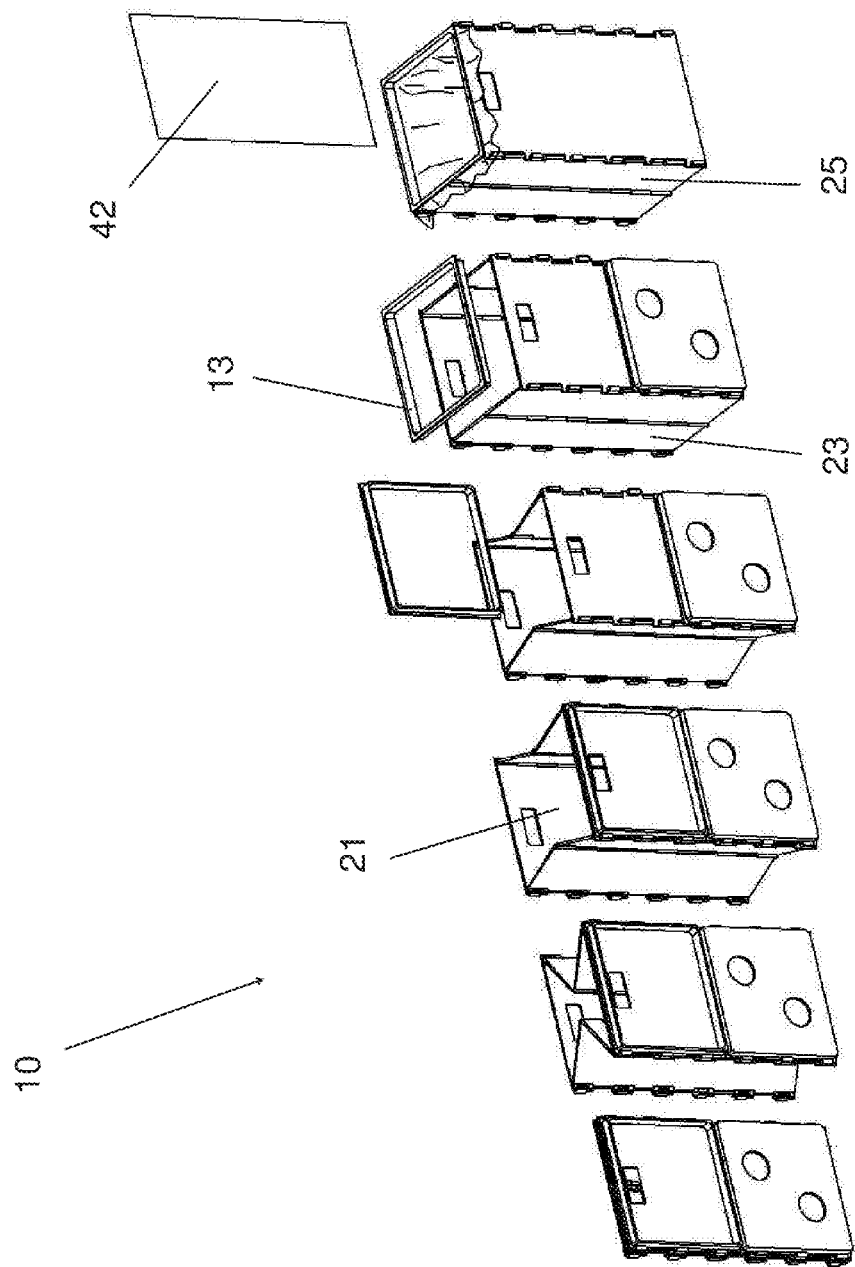
FIG. 1 shows an embodiment of the present invention in various stages of going from being fully collapsed, with a ring attached to the outside of one if its wide panels, to being fully opened and with a collection bag inserted into the holder.

The invention summarized above and defined by the enumerated claims may be better understood by referring to the following description, which should be read in conjunction with the accompanying drawings in which like reference numbers are used for like parts. This description of an embodiment, set out below to enable one to practice an implementation of the invention, is not intended to limit the preferred embodiment, but to serve as a particular example thereof. In addition, it is to be understood that the phraseology and terminology employed herein are for the purpose of description and should not be regarded as limiting. The invention is capable of other embodiments and of being practiced and carried out in various ways. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The present invention is seen to be a collapsible garbage or trash bag holder for primary use with a throw-away, trash collection bag, of the type that has a large opening through which trash can be inserted into the bag, and where the holder can fold into a flat shape for storage, and is especially well suited for use in locations that temporarily require garbage or trash collection. When the present invention is used without a collection bag or liner to create organized piles of waste, the present invention might more appropriately be referred to as a receptacle, rather than as a holder.

The present invention is intended to be used in, but is not limited to, locations that temporarily require a trash can. The receptacle can be quickly deployed and then, once it is no longer needed, it can be folded for storage. Since the holder can be folded, the holder will not waste space during storage. This allows the holder to be transported and stored efficiently.

The bag holder is designed to hold a bag for collection of a large volume of waste. The problem with large volumes of waste is that the weight of the waste may be very heavy. In a preferred embodiment of the present invention, the holder does not have a bottom so that the waste can be removed from the holder without lifting the waste out of the holder. In a preferred embodiment, the holder will be lined with a liner bag so that the waste is contained within the liner bag. The top ring will retain the bag in place. To take out the bag, the ring is removed, then the bag is tied at the top and the holder is lifted up off the contained trash, folded, and stored. The bag of trash can then be thrown into a proper disposal unit. The holder can be used without a bag or liner to create organized piles of waste when the holder is removed.

In general, the holder's profile is a rectangle constructed out of six panels. Two symmetric large panels comprise two of the opposite sides. The other two opposite sides are each comprised of two smaller panels that together are sized so that when the holder is folded the vertices of the smaller two sides, also known as the hinge points, clear each other for the holder to fold flat. The smaller panels are attached to each other and to the large panels by interlocking hinges. The smaller panel sides fold inwardly when the holder is collapsed. In a preferred embodiment, each smaller panel is slightly less than half as wide as each larger panel. Therefore, the holder can be folded into itself much like the way a paper bag flattens out.

A preferred embodiment of the invention is made of commercial grade injection molded plastic. Other versions of the invention could be made of various materials such as metal or wood. The invention must be made of a rigid material.

Figure 18:
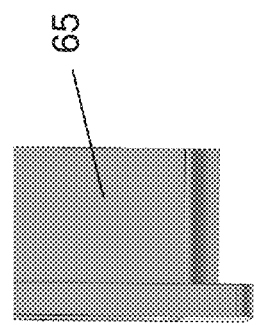
FIG. 18 is an enlarged view of a portion of FIG. 17.
Figure 21:
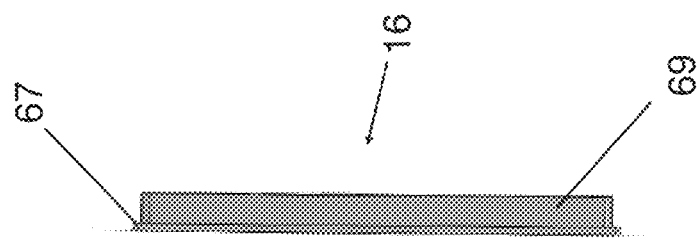
FIG. 21 is a side elevational view of the alternate top lid of FIG. 19.
Figure 19:
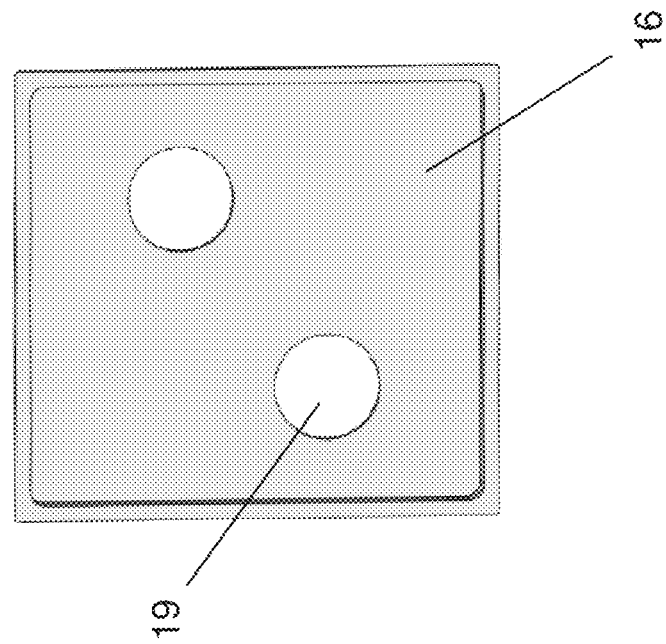
FIG. 19 is a top plan view of an alternate top lid according to an embodiment of the present invention.
Figure 20:
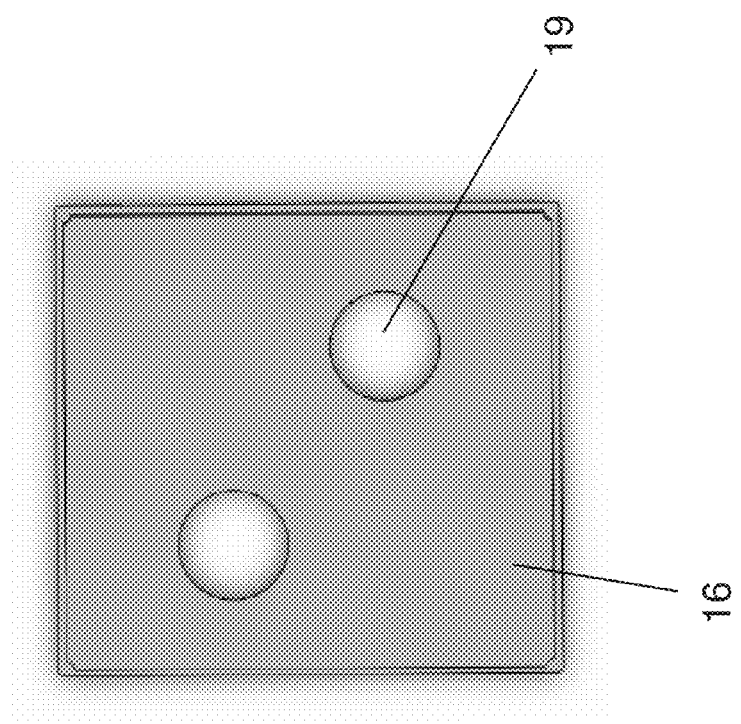
FIG. 20 is a bottom plan view of the alternate top lid of FIG. 19.
Figure 22:
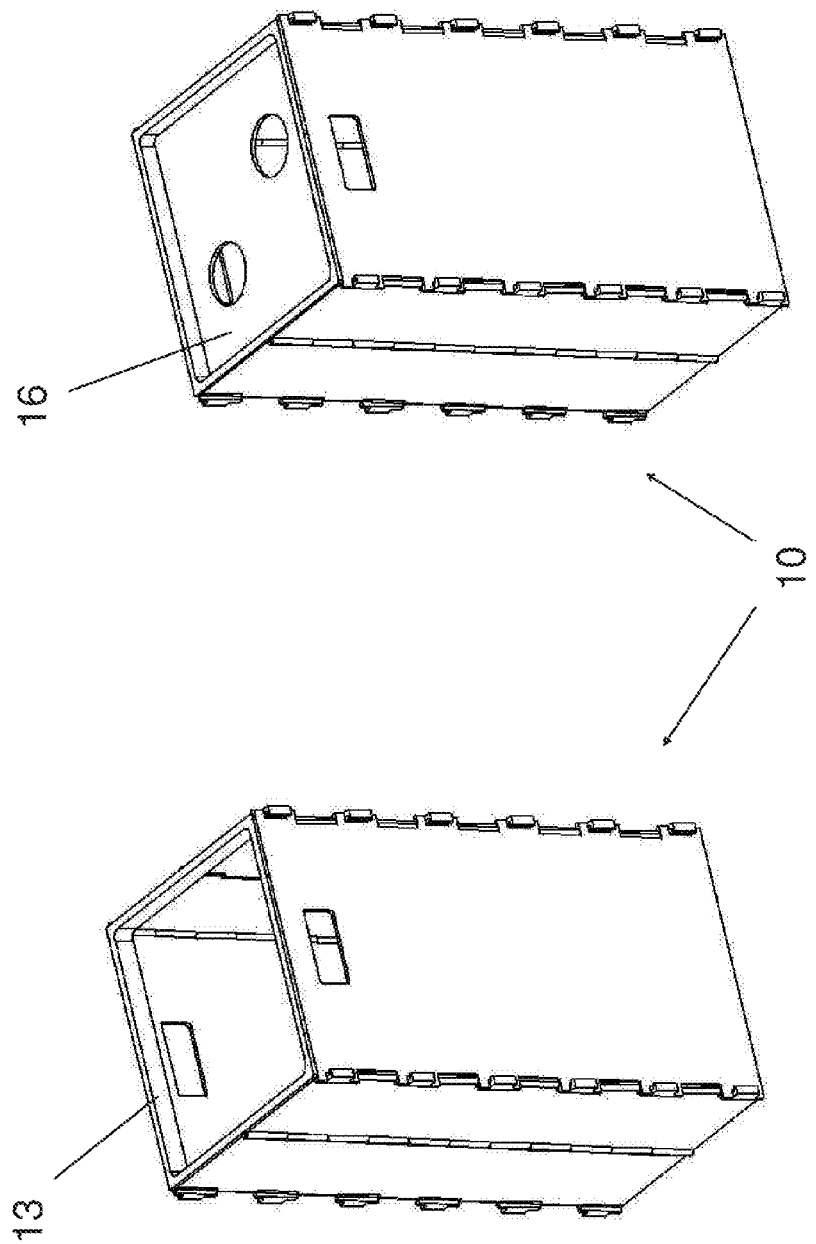
FIG. 22 is an isometric view of the holder with each type of top lid.
Figure 23:
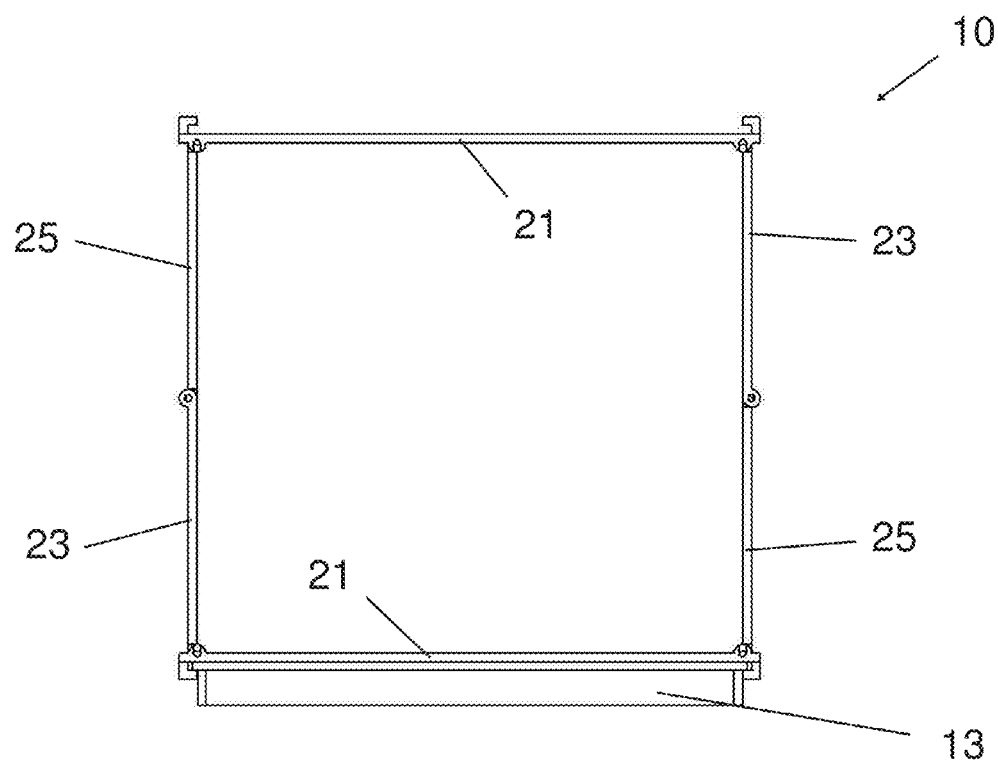
FIG. 23 is a top view of fully open holder according to an embodiment of the present invention.
Figure 24:
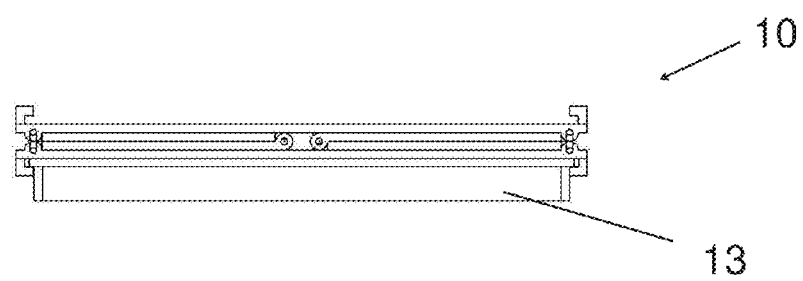
FIG. 24 is a top view of fully closed holder according to an embodiment of the present invention.

Referring to the drawings, FIG. 1 shows a holder 10 according to the present invention. When the holder 10 is deployed, the sides are folded out into a rectangular shape. The shape is then maintained by placing a top ring 13 over the holder 10. FIG. 1 show the present invention in various stages of going from being fully collapsed, with its top ring 13 attached to the outside of one if its panels, to being fully opened and with a collection bag inserted into the holder 10. The top ring 13 (see FIGS. 14-18) prevents the holder 10 from collapsing and holds the bag or other liner in place. When the top ring 13 is removed, the holder can collapse into a flat position having a thickness approximately equal to the thickness of the four sides. In a preferred embodiment, the holder 10 folds to a thickness of approximately 2 inches. Other embodiments could fold to other thicknesses. In some embodiments, the top ring 13 has a large opening for all waste. In other embodiments, an alternate lid 16 can replace the top ring 13, such as shown in FIGS. 19-21. Such alternate lid 16 has at least one shaped opening 19 for a specific kind of waste; an aluminum can is an example of such a kind of specific waste. Some versions of the holder 10 may have a weight constructed into the bottom of one or more of the sides to prevent the holder 10 from falling over when empty and/or under wind loads. Some embodiments of the holder 10 will have a foothold that can be used to seize the holder 10 when removing the top ring 13 and may further include finger holes for opening the holder 10 from its collapsed position. Preferably, all holders 10 of the same size can be nested onto each other by alternating their orientation for efficient storage.

Figure 2:
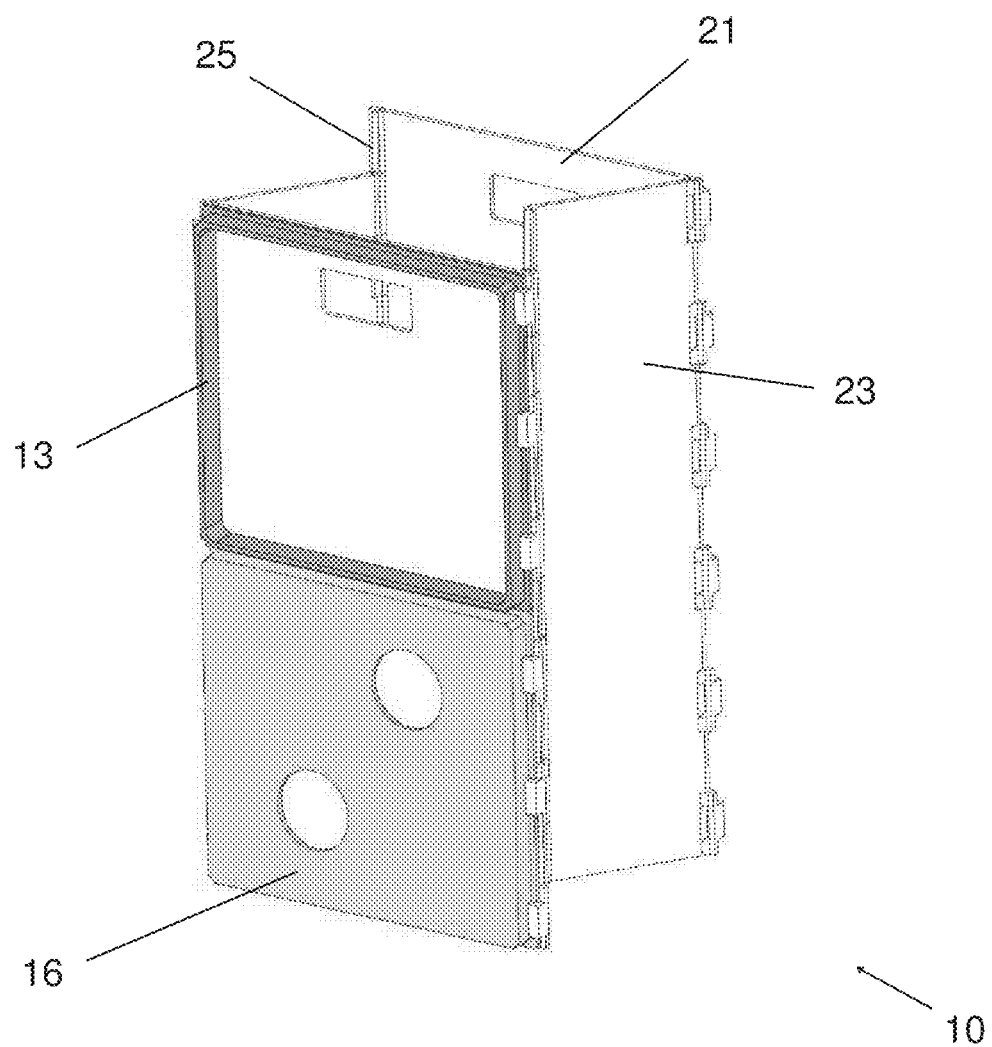
FIG. 2 is a perspective view of a partially collapsed bag holder according to an embodiment of the present invention.
Figure 4:
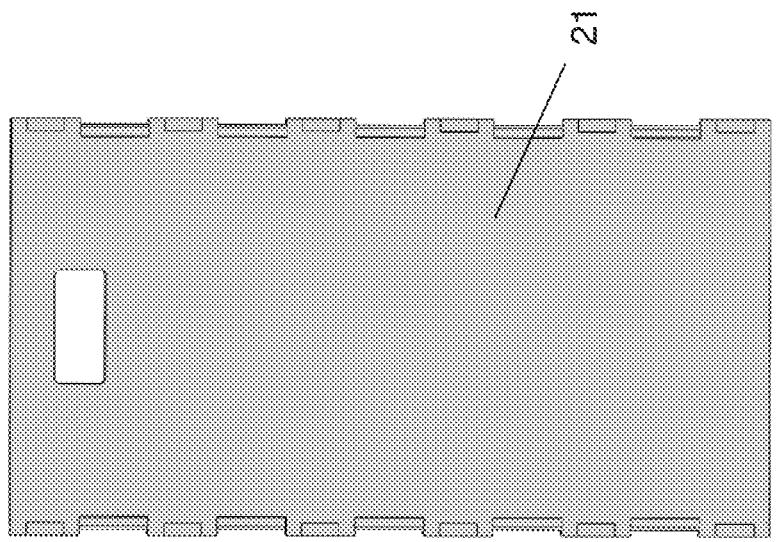
FIG. 4 is a rear elevational view of the holder of FIG. 2.
Figure 3:
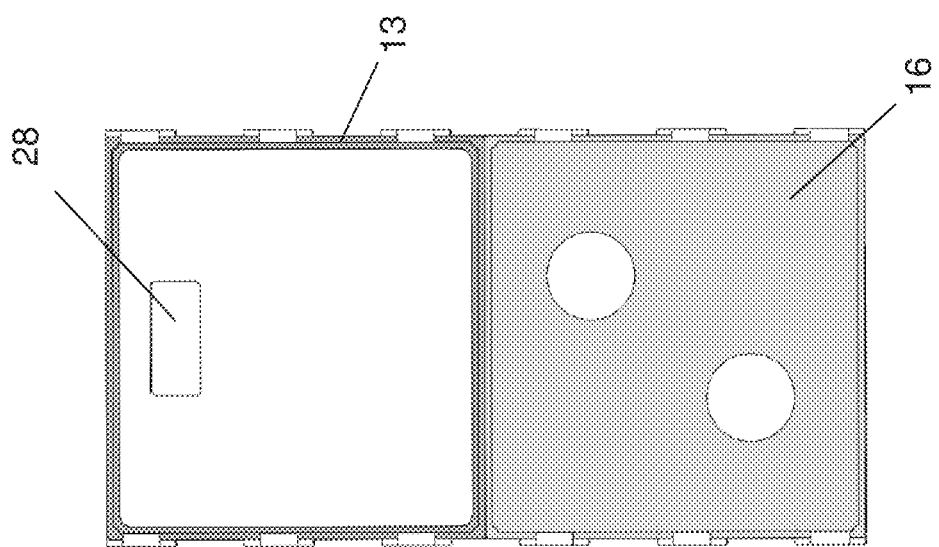
FIG. 3 is a front elevational view of the holder of FIG. 2.
Figure 5:
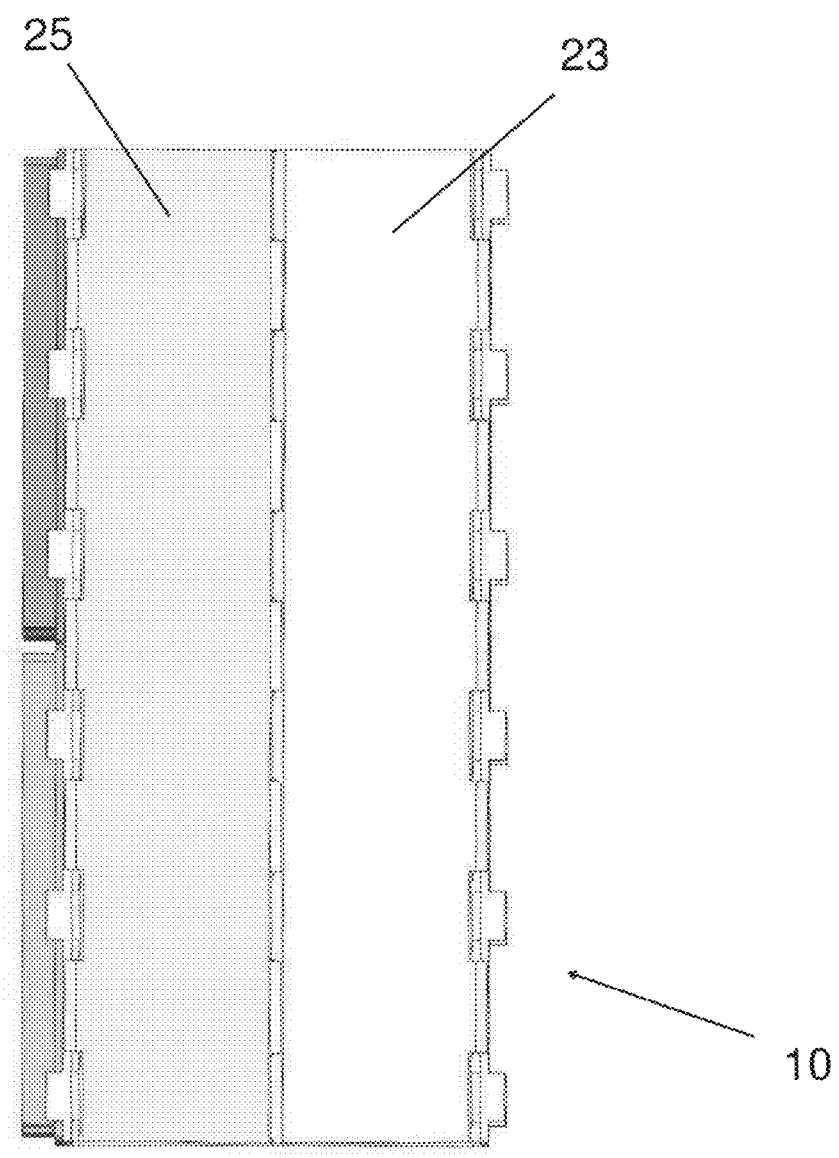
FIG. 5 is a side elevational view of the holder of FIG. 2.
Figure 8:
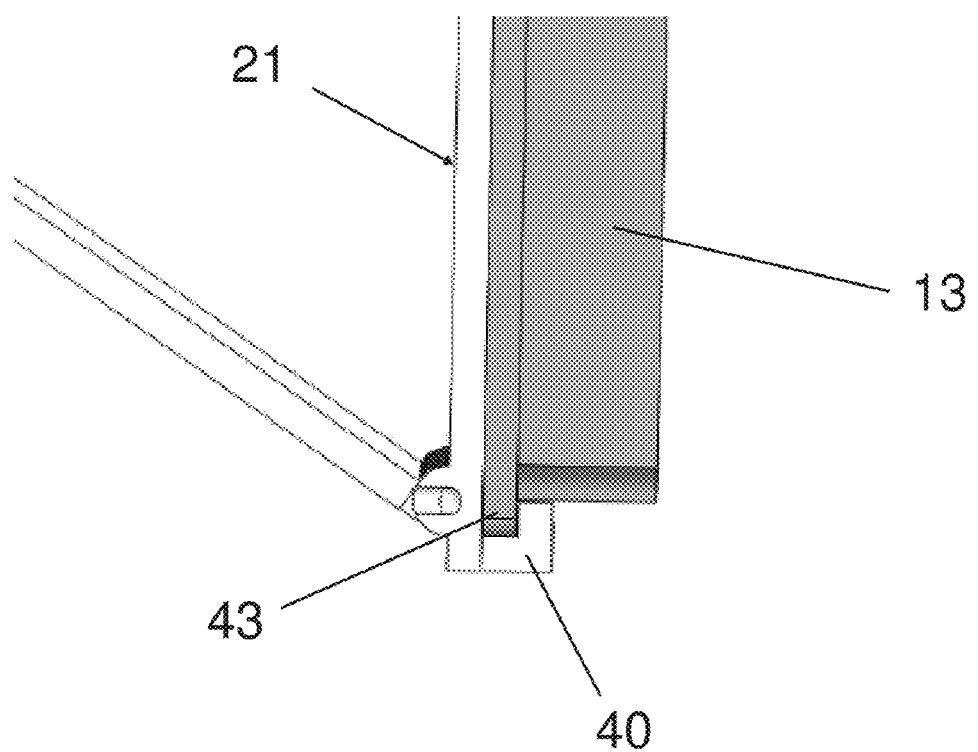
FIG. 8 is an enlarged view of a portion of FIG. 7.

FIG. 2 shows a perspective view of a partially collapsed bag holder 10 according to an embodiment of the present invention. The holder 10 has two wide panels 21 and four narrow panels, two each of panels 23 and 25. The wide panels 21 are hingedly attached at one long edge to panel 23 and at the opposite long edge to panel 25. Narrow panels 23 and 25 are hingedly attached to each other at their remaining long edge. In FIGS. 2-7, the holder 10 is partly folded at the attachment points of wide panel 21 and narrow panels 23, 25. Wide panel 21 may also include a handle opening 28 that can be used to aid in removing the holder 10 over the top of a filled trash collection bag. FIGS. 6 and 7 are bottom and top views, respectively, of the partially open holder 10. FIG. 8 is an enlarged portion of FIG. 7, labeled A.

Figure 9:
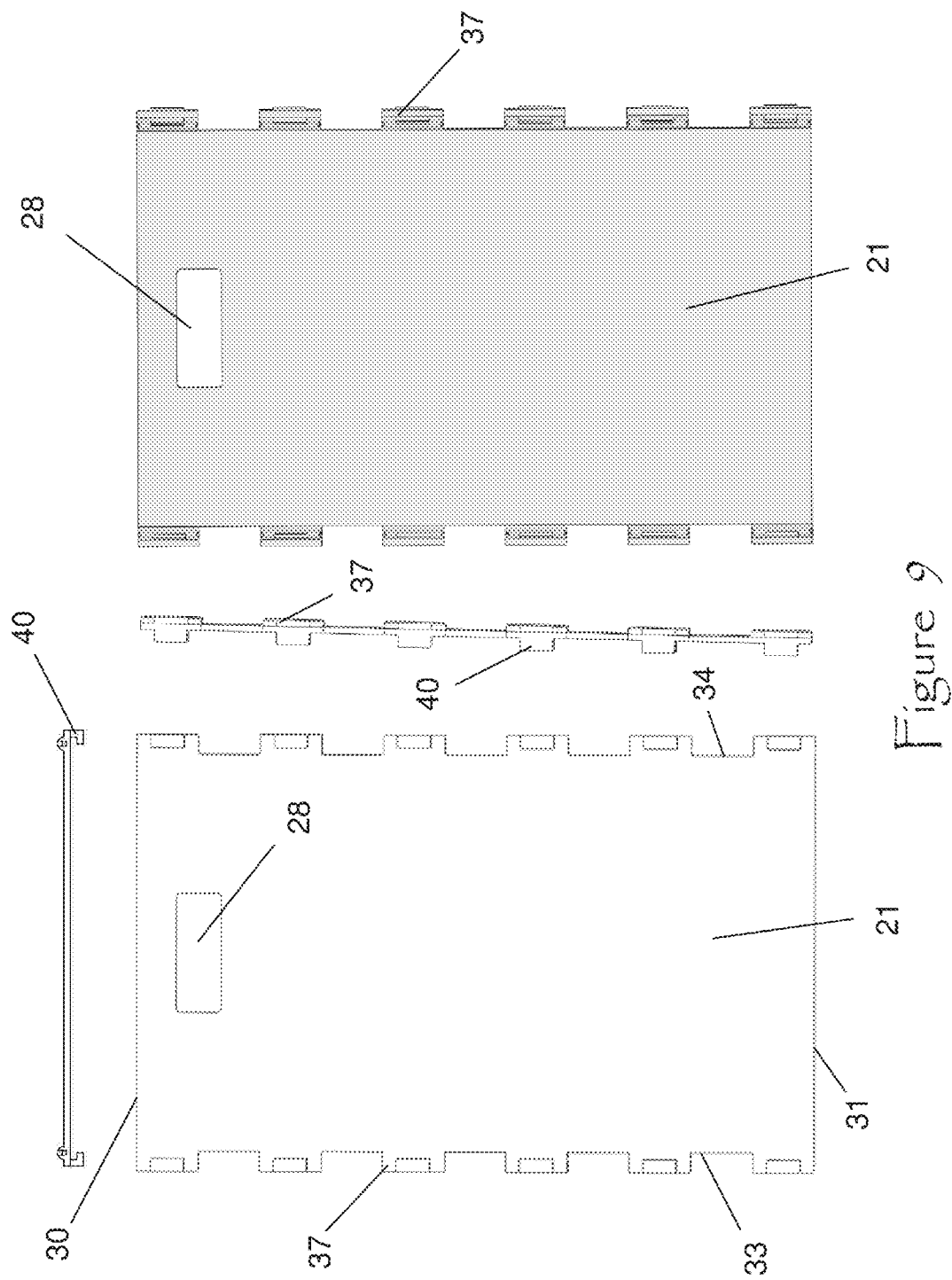
FIG. 9 is a series of views of a front and back panel for a holder according to the present invention.

FIG. 9 shows front, back, side, and top views of a wide panel 21 for a holder 10 according to the present invention. Panel 21 is substantially rectangular in shape having two short sides 30, 31 and two long sides 33, 34. The long sides 33, 34 have tabs 37 configured for attachment to narrow panels 23 and 25 to form a hinged joint. One panel 21 forms the front of holder 10 and a second panel 21 forms the back of holder 10.

In a preferred embodiment, the holder 10 includes a means for attaching the top ring 13 or alternate lid 16 to the side of the collapsed holder during storage. A plurality of flat hooks 40 can be integrated with the tabs 37. The flat hooks 40 are sized and configured to enable a ledge 43 of the top ring 13 to slide under the flat hook 40, as shown in FIG. 8.

In some embodiments of the invention, the flat hooks 40 can be used to allow for inserting a panel 42 (FIG. 1) with advertising, sponsorships, and or useful information pertaining to the event or location in which the holder 10 is used. As shown in FIG. 1, an advertising panel 42 can be inserted into the flat hook pieces 40. This is particularly useful for community and government fund raising events, construction site advertising, and any event where a display of any kind maybe of use.

Figure 10:
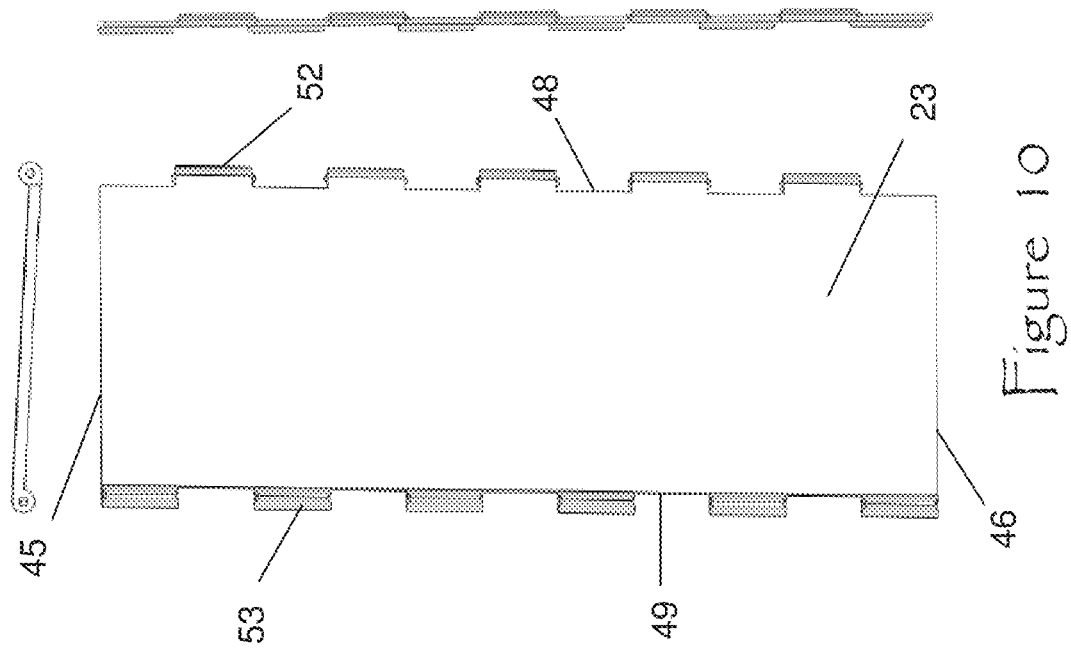
FIG. 10 is a series of views of one side panel for a holder according to the present invention.
Figure 11:
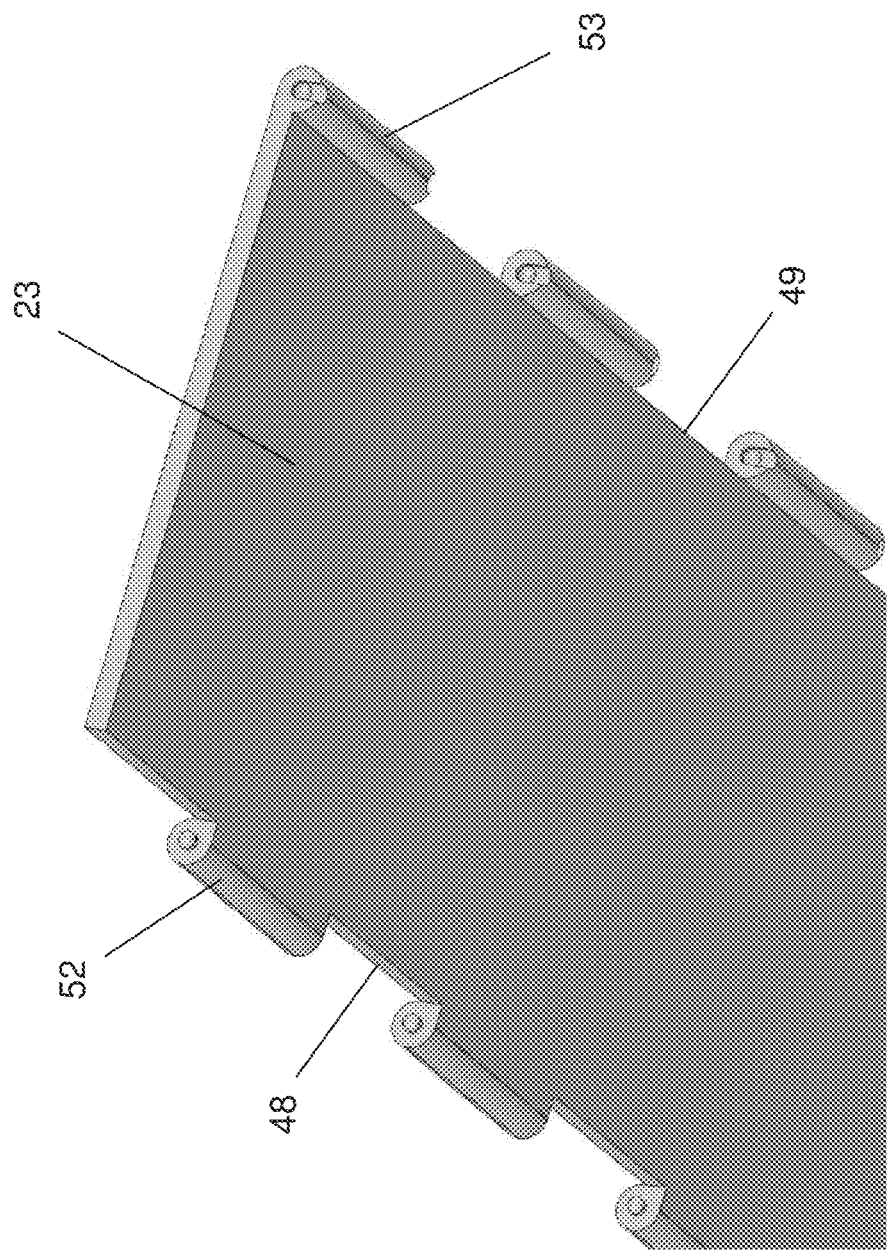
FIG. 11 is an enlarged view of a portion of the panel in FIG. 10.

FIGS. 10 and 11 show front, side, and top views of one narrow panel 23 for a holder 10 according to the present invention. Panel 23 is substantially rectangular in shape having two short sides 45, 46 and two long sides 48, 49. The long side 48 has tabs 52 configured for attachment to wide panel 21. The long side 49 has tabs 53 configured for attachment to narrow panel 25 to form a hinged joint that translates inwardly of the holder 10 when in a collapsed position. One panel 23 forms half of each side of the holder 10.

Figure 12:
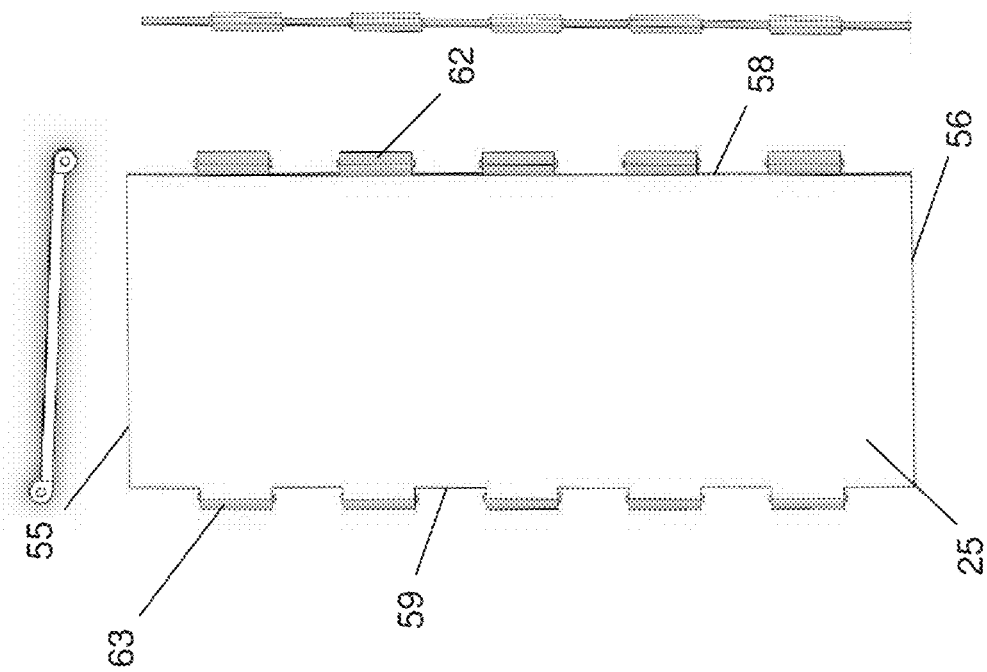
FIG. 12 is a series of views of another side panel for a holder according to the present invention.
Figure 13:
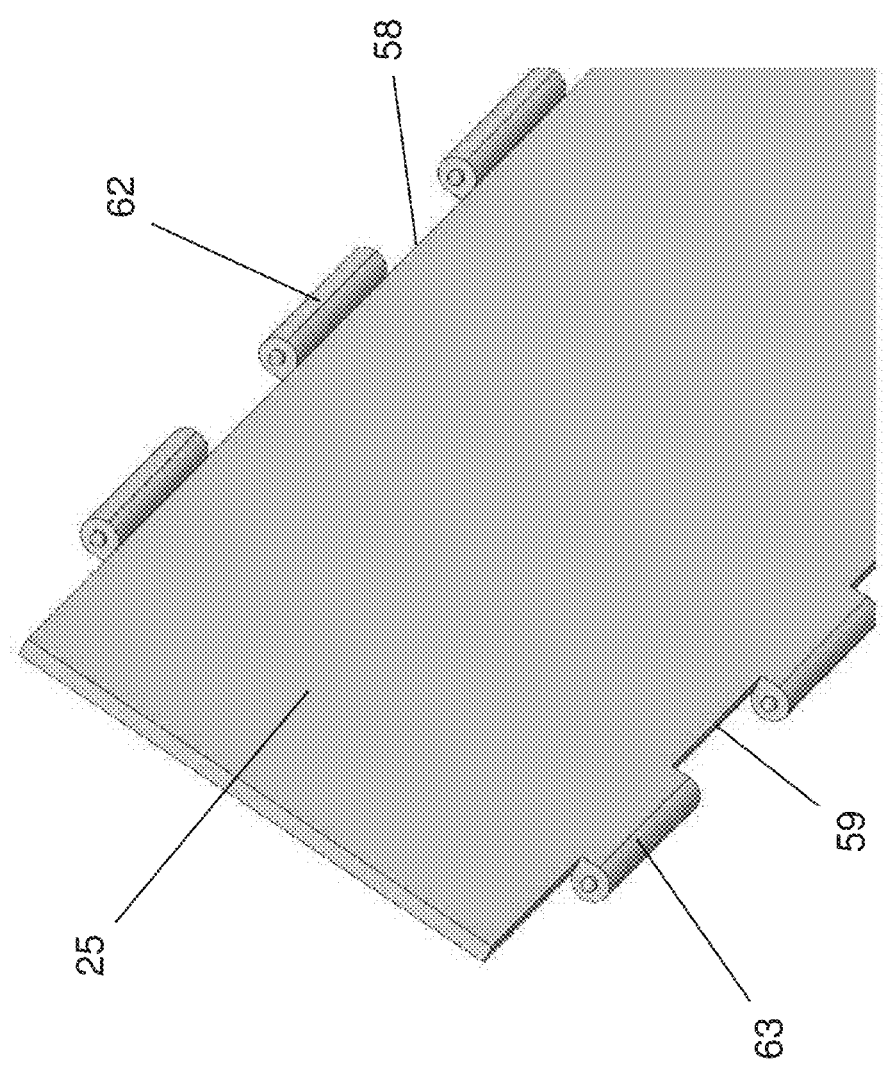
FIG. 13 is an enlarged view of a portion of the panel in FIG. 12.

FIGS. 12 and 13 show front, side, and top views of a second narrow panel 25 for a holder 10 according to the present invention. Panel 25 is substantially rectangular in shape having two short sides 55, 56 and two long sides 58, 59. The long side 58 has tabs 62 configured for attachment to wide panel 21. The long side 59 has tabs 63 configured for attachment to narrow panel 23 to form a hinged joint that translates inwardly of the holder 10 when in a collapsed position. One panel 25 forms half of each side of the holder 10.

The hinges formed by the long sides of panels 21, 23, and 25 can be any kind of hinge. A preferred embodiment envisions a traditional knuckle and pin hinge illustrated in FIGS. 11 and 13. Other hinges could be made of a fold or crease in the material that the wide panel 21 and narrow panels 23, 25 are made of. Alternatively, the hinge could be a piece of flexible material that links the wide panel 21 and narrow panels 23, 25 together.

Figure 14:
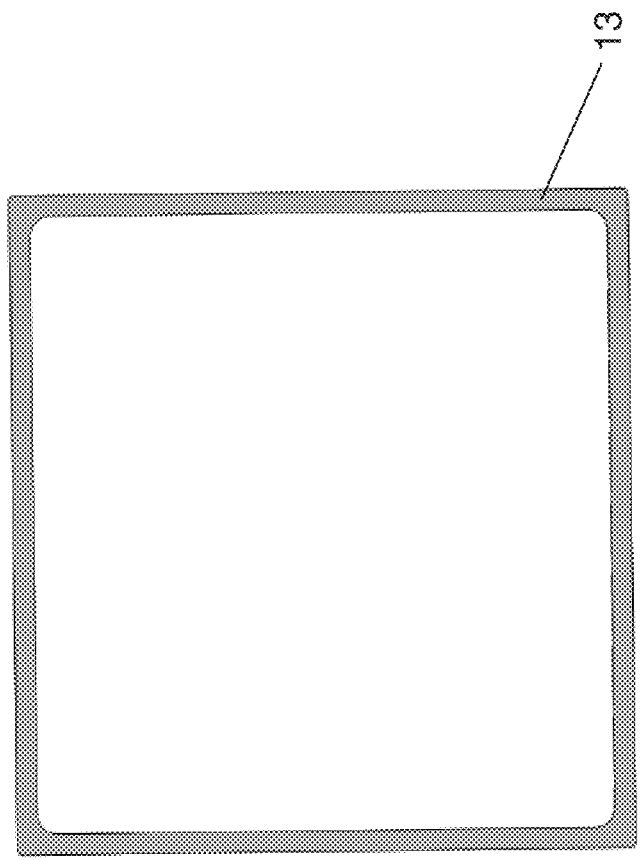
FIG. 14 is a top plan view of top ring according to an embodiment of the present invention.
Figure 16:
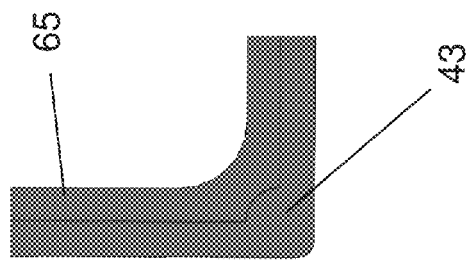
FIG. 16 is an enlarged view of a portion of FIG. 15.
Figure 15:
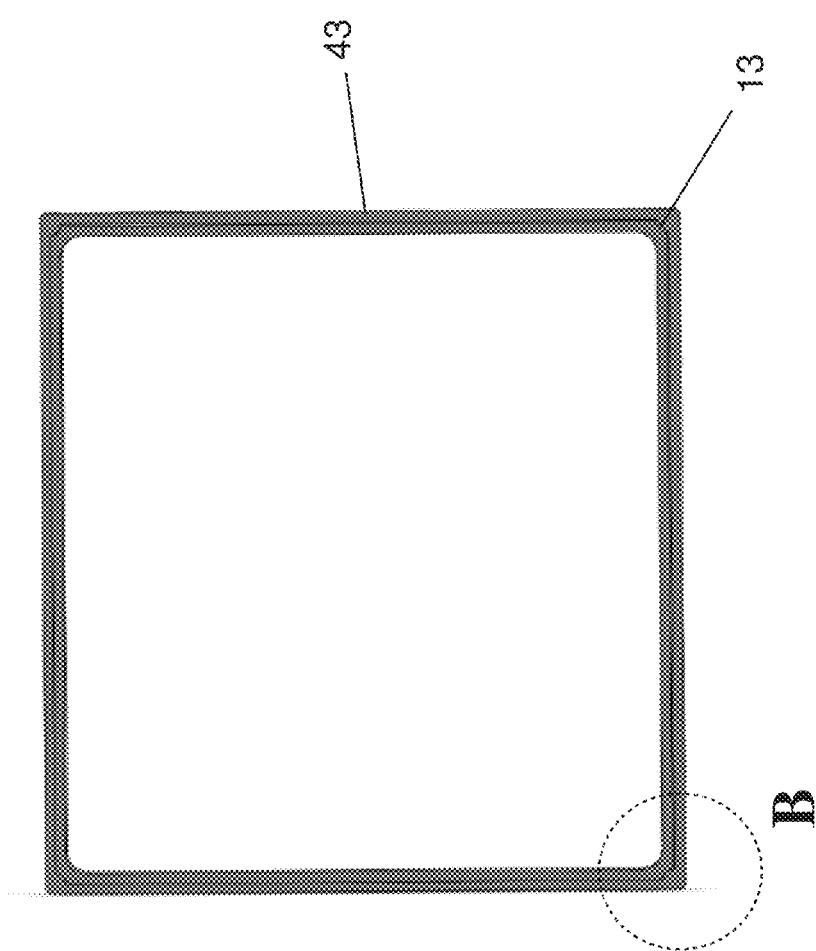
FIG. 15 is a bottom plan view of the top ring of FIG. 14.
Figure 17:
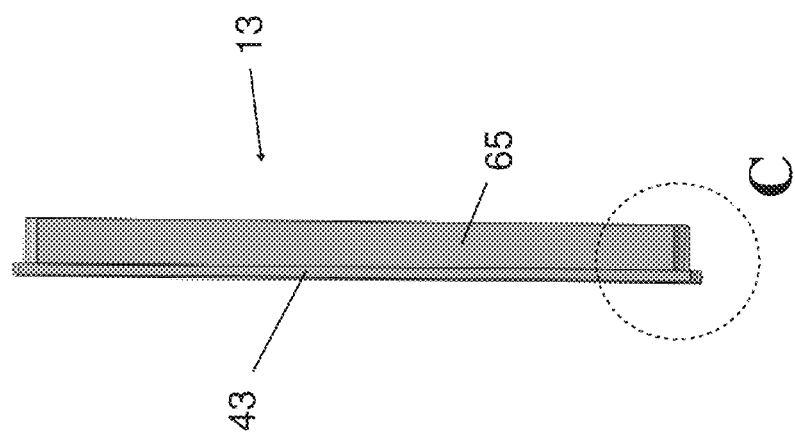
FIG. 17 is a side elevational view of the top ring of FIG. 14.

FIG. 14 is a top view of a top ring 13 according to the present invention. Top ring 13 is sized and configured to cover the top edges 30, 45, and 55 of the wide panel 21 and narrow panels 23, 25, respectively, when in the holder 10 is in a fully open position. FIG. 15 shows a bottom view of top ring 13, and FIG. 17 shows a side view of top ring 13. FIG. 16 is an enlarged portion of FIG. 15, labeled B and FIG. 18 is an enlarged portion of FIG. 17, labeled C. The top ring 13 includes a ledge 43 around the perimeter of the top ring 13. The top ring 13 further includes a flange 65 around the inner portion of the top ring 13, adjacent to and substantially perpendicular to the ledge 43. The flange 65 is sized and configured to fit inside the top edges 30, 45, and 55 of the wide panel 21 and narrow panels 23, 25, respectively, when the holder 10 is in the fully open position. As shown in FIG. 16, the flange 65 may be beveled at its corner to allow for fit with the hinge formed at the intersection of the wide panel 21 and narrow panels 23, 25.

FIG. 19 shows an alternative version to maintain the holder 10 in an open condition. The lid 16 does not have the typical large opening through which trash is passed in order to deposit it in a collection bag that is kept by the holder 10. In this embodiment, the lid 16 has one or more shaped openings 19 for a specific kind of waste. An aluminum can is an example of such a kind of specific waste. FIG. 20 shows a bottom view of lid 16, and FIG. 21 shows a side view of lid 16. As with the top ring 13 described above, lid 16 includes a ledge 67 around the perimeter of the lid 16. The lid 16 further includes a flange 69 around the inner portion of the ledge 67, adjacent to and substantially perpendicular to ledge 67. The flange 69 is sized and configured to fit inside the top edges 30, 45, and 55 of the wide panel 21 and narrow panels 23, 25, respectively, when the holder 10 is in the fully open position.

The holder 10 can be made of any rigid material. A preferred embodiment of the invention envisions a holder 10 made of plastic. Other versions of the holder 10 can be made of metal or wood. Still other versions of the holder 10 can be made of cardboard or rigid paper. In some versions, different parts of the holder 10 can be made of different materials. As an example, and not meant as a limitation, the wide panels 21 could be made of one material, while the narrow panels 23, 25 could be made of another. Alternatively, the top ring 13 could be made of a different material than the rest of holder 10.

The invention has been described with references to preferred embodiments. While specific values, relationships, materials and steps have been set forth for purposes of describing concepts of the invention, it will be appreciated by persons skilled in the art that numerous variations and/or modifications can be made to the invention as shown in the specific embodiments without departing from the spirit or scope of the basic concepts and operating principles of the invention as broadly described. It should be recognized that, in the light of the above teachings, those skilled in the art could modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with the underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

What is claimed is:

1. A holder for recyclables or trash, comprising:
a pair of rectangular front and rear panels, each having a top edge, a bottom edge, and side edges;
a plurality of vertically aligned, opposing hooks positioned on said rectangular front panel adjacent said side edges of said front panel;
two side panels, each having two rectangular, foldable parts, and each foldable part having a top edge, a bottom edge, and side edges, wherein said top edges of said front and rear panels and said top edges of said side panels form an upper perimeter of said holder;
side hinges that connect adjoining side edges of said side panel foldable parts to allow the foldable parts to fold together along said side hinges;
primary hinges that connect the side edges of said front and rear panels to outer side edges of said side panel foldable parts to allow the side panels to be folded so that the front and rear panels can be brought into close and overlapping proximity to one another, and
a first top piece adapted to fit over the top edges of said panels to locate and hold open an opening created by said panels, said first top piece having a rectangular top face having an outer edge defining an outer perimeter of said first top piece, and a flange extending downward from said first top face and extending around said perimeter of said first top piece, said flange defining an inner perimeter of said first top piece, wherein said outer perimeter of said first top piece is sized to fit between said opposing hooks on said front panel, and said inner perimeter of said first top piece is sized to receive the upper perimeter of said holder.

2. The holder of claim 1, having an open top and bottom.

3. The holder of claim 1, said front and rear panels being substantially symmetric and having two short sides and two long sides.

4. The holder of claim 3 wherein said long sides comprise one or more tabs configured for attachment to said side panels.

5. The holder of claim 1 wherein the side panels fold inwardly when the holder is collapsed.

6. The holder of claim 5 wherein said side panels are sized so that when the holder is folded the vertices of the side hinges clear each other for the holder to fold flat.

7. The holder of claim 1, further comprising:
a second top piece adapted to fit over the top edges of said panels to locate and hold open an opening created by said panels, said second top piece having a rectangular top face having an outer edge defining an outer perimeter of said second top piece, and a flange extending downward from said second top face and extending around said perimeter of said second top piece, said flange defining an inner perimeter of said second to piece, wherein said outer perimeter of said second to piece is sized to fit between said opposing hooks on said front panel, and said inner perimeter of said second to piece is sized to receive the upper perimeter of said holder, and wherein said second top piece has a generally planar top face having at least one small opening extending therethrough for insertion of specific waste.

8. The holder of claim 7, wherein each of said first top piece and said second top piece are sized to fit to ether within a profile of said front panel when both are positioned between said opposing hooks on said front panel.

9. The holder of claim 7 wherein said small opening is specifically shaped for desired waste.

10. The holder of claim 1, said front and rear panels further comprising handle openings.

11. The holder of claim 1, said side panels further comprising finger holes for opening said holder.

12. The holder of claim 1 wherein said panels comprise molded plastic.

* * * * *